(12) United States Patent
Saunders et al.

(10) Patent No.: US 6,724,436 B1
(45) Date of Patent: Apr. 20, 2004

(54) VIDEO SIGNAL PROCESSING

(75) Inventors: Nicholas Ian Saunders, Basingsoke (GB); Robert Webb, Basingstoke (GB)

(73) Assignee: Sony United Kingdom Limited, Weybridge (GB)

( * ) Notice: Subject to any disclaimer, the term of this patent is extended or adjusted under 35 U.S.C. 154(b) by 0 days.

(21) Appl. No.: 09/548,196

(22) Filed: Apr. 13, 2000

(30) Foreign Application Priority Data

Apr. 16, 1999 (GB) .............................................. 9908811

(51) Int. Cl.[7] ................................................. H04N 7/18
(52) U.S. Cl. .................... 348/584; 348/586; 725/240.26
(58) Field of Search ................................. 348/584, 586, 348/587, 590, 591, 416.1, 415.1, 412.1, 413.1, 699, 750, 593, 598, 599; 345/629, 630, 632, 633, 634, 636; 375/240, 240.26; H04N 7/18

(56) References Cited

U.S. PATENT DOCUMENTS 5,428,401 A * 6/1995 Hinson ........................ 348/586
6,088,396 A * 7/2000 Takahashi .............. 375/240.16

FOREIGN PATENT DOCUMENTS

EP 0 656 729 6/1995

* cited by examiner

*Primary Examiner*—Michael H. Lee
(74) *Attorney, Agent, or Firm*—Frommer Lawrence & Haug LLP; William S. Frommer; Darren M. Simon

(57) ABSTRACT

A method of mounting a volume from a tape medium on a tape drive apparatus. The method reads a bar-code indicating the volume from a tape cartridge, attaches the tape cartridge to a tape drive, and detects the current track position on the basis of a longitudinal track. The method then determines whether a beginning volume label or a last used area volume label is nearer to the current track position, reads the nearer volume label from the tape medium, confirms the volume by comparing the nearer volume label with the bar-code, and mounts the volume onto the tape drive.

49 Claims, 8 Drawing Sheets

A
Macroblock (n)

MB (n) is Non-Logo

B
Macroblock (n) + Vector MV

XXXX = Best Match

A
Macroblock (n)

MB (n) is Non-Logo

B
Macroblock (n) + Vector

XXXX = Best Match

A
Macroblock (n)

B
Bitmap file

C
Macroblock (n)

D
Bit map file + border

VIDEO SIGNAL PROCESSING

BACKGROUND OF THE INVENTION

1. Field of the Invention

This invention relates to video signal processing, for example, processing in which compressed data representing two or more video signals are combined. Embodiments of the invention concern video signals compressed according to the known MPEG-2 standard, but the invention is not limited to such signals.

2. Description of the Prior Art

It is often desirable to mix, wipe or superimpose two or more video signals. For example, a so-called wipe effect might be used to transition between two different scenes in a television programme, or a so-called logo or other computer-generated signal such as a subtitle or a set of credits might need to be superimposed over a video image without otherwise disrupting the underlying image.

With analogue video signals, or even with uncompressed digital video signals, this operation is relatively straightforward. A key signal can be used to control the level of each of the constituent video signals (say, signals "A" and "B") at each pixel position, with the two level-controlled signals then being added together. A basic relationship between the level of the key K signal, the levels A and B of the input pixels and the level of out output pixel at each pixel position might be:

Output pixel value=$A(1-K)+BK$

This process is carried out for each output pixel. So, if signal A is to be replaced in its entirety by signal B at a particular pixel position, the key signal would be 1 (otherwise expressed as 100%), and if there is to be a 50:50 mix of the two pixels the key value would be 0.5 or 50%.

The situation is much more difficult when either or both inputs is a compressed video stream. In a compressed video stream such as an MPEG-2 video stream, pixels are generally compressed as blocks known as macroblocks, so that it is not possible to derive the value of a particular pixel directly from the compressed video signal.

Compressed video signals are also often subject to an overall limit on the quantity of data that can be used to transmit or store the signal. While there can be some variation from picture to picture, or even from group-of-pictures (GOP) to (GOP), the time-averaged data rate is often constrained to the capacity of a transmission or storage channel. This allowable variation from picture to picture of GOP to GOP can mean that two signals to be combined can have the same nominal data rate but very different instantaneous data rates. So, when constructing a composite video signal from a group of video signals including one or more compressed signals, great care is needed to avoid a data overflow or underflow.

A third feature of compressed video signals relevant to this discussion is that they often make use of motion vectors to indicate blocks of temporally preceding or following pictures which are similar to a block of a current picture and so can cut down the amount of data needed to encode the current picture.

One way of handling these problems is to decompress the entire compressed input signals, carry out the mixing or similar process in the non-compressed domain and then recompress the resulting composite picture.

In systems such as the MPEG-2 system each generation of compression tends to reduce the quality of the resulting images. It is undesirable if the simple addition of logo or similar information causes a deterioration in the overall image quality of the pictures to which the logo information is added.

SUMMARY OF THE INVENTION

According to one aspect of the present invention, there is provided a video signal processor comprising a first input arrangement for receiving a decompressed first video signal representing first video information and preserved transcoding parameters associated with the pictures of the signal and relating to the compression, a second input for receiving a second video signal representing second video information to be combined with the said first video information, a combiner for combining the second video information with the first video information to produce a picture of the combined information, comprising at least one part derived only from the first signal and at least one other part derived at least partly from the second signal, and an encoder for compression encoding the said picture to produce a combined signal representing the combined information, which encoder reuses at least one of the said preserved parameters for encoding at least the said at least one part of the combined information which is derived only from the first signal.

Preferably, the processor has a first input for receiving a compressed first video signal, and a decoder for decoding the compressed first video signal whilst preserving the transcoding parameters in association with the pictures.

According to one aspect of the present invention there is provided a method of processing a video signal comprising the steps of:

receiving a compressed first video signal representing first video information including transcoding parameters associated with the frames of the signal and relating to the compression, decoding the compressed first video signal whilst preserving the parameters in association with the frames, receiving a second video signal representing second video information to be combined with the said first video information, combining the second video information with the first video information to produce a picture of the combined information, comprising at least one part derived only from the first signal and at least one other part derived at least partly from the second signal, and encoding the said picture to produce a combined signal representing the combined information, which encoder reuses at least one of the said preserved parameters for encoding at least the said at least one part of the combined information which is derived only from the first signal.

Reusing the preserved motion vectors helps to maintain the overall picture quality because recalculating motion vectors may introduce errors. In addition the picture quality of image parts derived solely from the first signal is maintained.

According to a further aspect of the present invention, there is provided a computer program product providing computer executable instructions, which when loaded on to a programmable signal processor causes the processor to implement the method of said another aspect of the invention.

The invention allows any reduction in image quality due to the recoding of the combined video information to be minimised or at least reduced by re-using preserved parameters for parts of the combined image which are derived from the first video signal.

In an embodiment, the first signal comprises intra-encoded pictures and inter-encoded pictures, and the encoder re-encodes intra-encoded pictures of the first signal as intra-encoded pictures of the combined signal and re-encodes inter-encoded pictures of the first signal as inter-encoded pictures of the combined signal. Intra-encoded pictures are containing the whole video information of a picture encoded according to the coding scheme applied to the picture. An intra-encoded picture does not require information from any other picture when decoded to reproduce the original whole picture. An inter-encoded picture requires information from another picture, e.g. an intra-encoded picture, to reproduce the original whole picture when decoded. An inter-encoded picture is for example the difference between a picture and a prediction of the picture.

In MPEG, an I-frame is an intra-encoded picture, and P and B frames are versions of inter-encoded pictures.

Preferably in embodiments for processing video information including I, P and B pictures, the encoder is arranged to encode I, P and B pictures of the first video signal as I, P and B pictures respectively of the combined signal. Thus the type of picture (intra, or inter; I, P or B) is unchanged contributing to preservation of image quality and reducing the amount of re-encoding.

In the embodiment, the encoder preferably reuses at least one of the said preserved parameters for encoding at least the said at least one part of the combined information of an intra-encode picture which is derived only from the first signal and re-encodes at least one transcoding parameter of at least one part of the combined information of an inter-encoded picture which is derived at least partly from the second signal. In embodiments of the invention, intra (I) encoded pictures are re-coded using preserved parameters for at least parts thereof derived solely for the first signal to maintain image quality. In one embodiment the encoder re-uses the said at least one preserved parameter associated with an I-picture of the first signal when encoding the whole of the corresponding I-picture of the combined signal. The said one parameter is most preferably the quantisation parameter. Thus intra-encoded pictures which are most significant for determining picture quality re-use transcoding parameters to maintain picture quality.

In another embodiment, the encoder re-uses the said at least one preserved parameter associated with an I-picture of the first signal when encoding part(s) of the corresponding I-picture of the combined signal which are not derived from the second signal and re-encodes the said at least one preserved parameter of other part(s) of the corresponding I-picture of the combined signal which are derived from the second signal. Preferably, the said at least one preserved parameter is a quantisation parameter, and the encoder responds to a threshold level of an image parameter, and: reuses the preserved parameter for those other part(s) of the corresponding I-picture of the combined signal which are derived from the second signal and for which the image parameter is one of lesser and greater than the threshold level; and re-calculates the quantisation parameter for those other part(s) of the corresponding I-picture of the combined signal which are derived from the second signal and for which the image parameter is the other of lesser and greater than the threshold level.

Inter-encoded pictures, (e.g. P pictures) are less important to image quality than I pictures. However in a preferred embodiment the encoder reuses at least one of the preserved parameters associated with a P picture when re-encoding part(s) of the P pictures which are not derived from the second signal. Preferably, the encoder re-calculates the said at least one of the transcoding parameters over other parts of the P picture. The transcoding parameter is preferably the quantisation parameter.

In B pictures the encoder re-calculates at least one of the transcoding parameters over the whole of a B picture. The transcoding parameter is preferably the quantisation parameter.

In preferred embodiments DCT_type is re-used in I, P and B pictures.

Embodiments of the invention also re-use motion vectors. In an embodiment, the said transcoding parameters include, in respect of inter-encoded pictures, motion vectors which refer to parts of reference pictures, and the encoder is arranged to produce compression encoded pictures including an inter-encoded picture and a reference picture, which encoder re-uses the said preserved motion vectors for those of the said first parts of the inter-encoded picture for which the preserved motion vectors refer to parts of the reference picture which are derived.

Preferably, new motion vectors are provided for parts of the inter-encoded picture which are derived at least in part from the second video signal. More preferably, new motion vectors are provided for parts of the inter-encoded picture which are derived solely from the first signal but for which the preserved vectors refer to parts of the reference picture which are derived at least in part from the second video signal.

In embodiments, the encoder calculates motion vectors for a picture of the combined video information, and tests the calculated and preserved motion vectors against a reference map indicating, in the reference picture to which the vectors refer, the positions of information derived at least in part from the second signal.

This maintains picture quality at least for parts of the pictures which are derived only from the first signal and have motion vectors which refer to unchanged parts of a reference picture.

BRIEF DESCRIPTION OF THE DRAWINGS

Illustrative embodiments of the invention will now be described with reference to the accompanying drawings in which.

DESCRIPTION OF THE PREFERRED EMBODIMENTS

Overview

FIGS. 1 to 4 illustrate in schematic form some video processing operations which can be carried out to combine one video signal (A) with another video signal (B).

Figure 1:
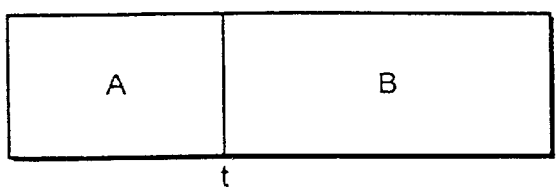
FIG. 1 schematically illustrates a video splice operation.
Figure 2:
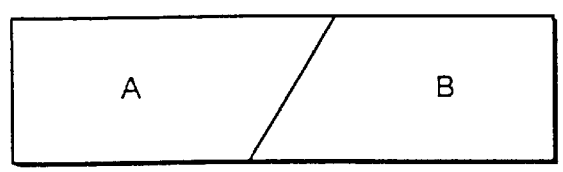
FIG. 2 schematically illustrates a video dissolve operation.

FIGS. 1 and 2 are schematic "timeline" representations for a splice operation and a dissolve operation respectively. In FIG. 1, an abrupt change is made from signal A to signal B at a particular time t. In FIG. 2, a gradual change is made so that signal A is mixed into signal B over a particular time period.

Figure 3:
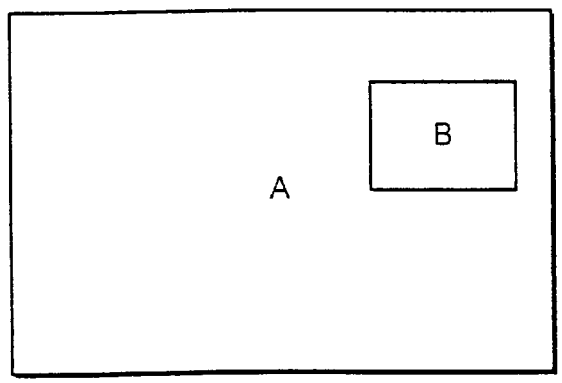
FIG. 3 schematically illustrates a video logo insertion operation.
Figure 4:
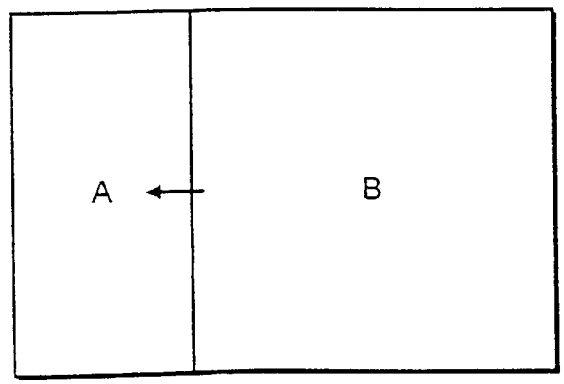
FIG. 4 schematically illustrates a video wipe operation.

FIGS. 3 and 4 schematically illustrate television pictures themselves. FIG. 3 illustrates a "logo" insertion, where a sub-portion of picture A is replaced by or mixed with picture B, and FIG. 4 illustrates a wipe operation where the two pictures occupy complimentary portions of the screen and the boundary between the two is movable.

The present description is concerned with the types of video processing operations which need to be carried out in connection with the types of video processing operations which need to be carried out in connection with FIGS. 2, 3 and 4. In other words, these are operations where parts of both pictures A and B are present on the screen at the same time. The matter of FIG. 1, which is the splicing of one video signal to another, is not dealt with in the present application.

FIGS. 5 to 7 show, again in schematic form, the superposition of a logo onto a video picture, that is to say a more detailed version of FIG. 3.

Figure 5:
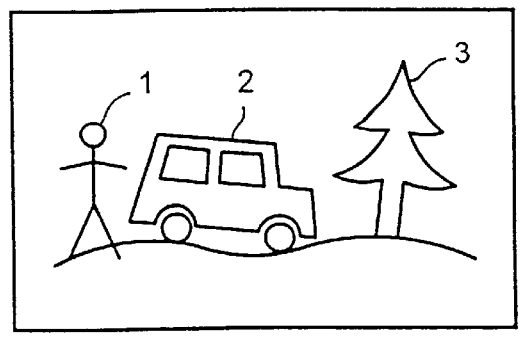
FIGS. 5 and 6 schematically illustrates a video logo insertion operation in greater detail.
Figure 6:
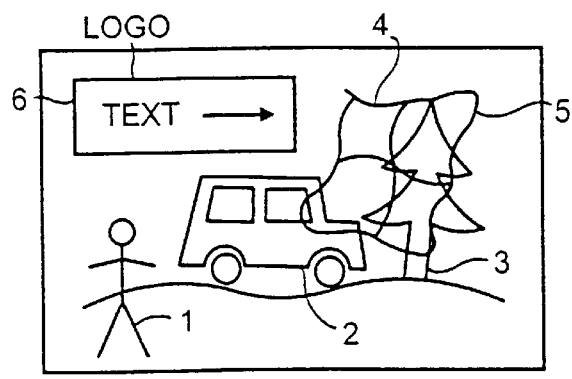

In FIG. 5, a video picture shows an original scene which may typically include moving objects 1, 2 and static objects 3. In FIG. 6, additional video information including a textual logo 6 and further information such as a geographical map 5 is superposed over the original image. An example of circumstances in which this might be desired is to broadcast a warning of an impending occurrence such as a weather-related warning for a particular region, while not disturbing the underlying program too much.

Figure 7:
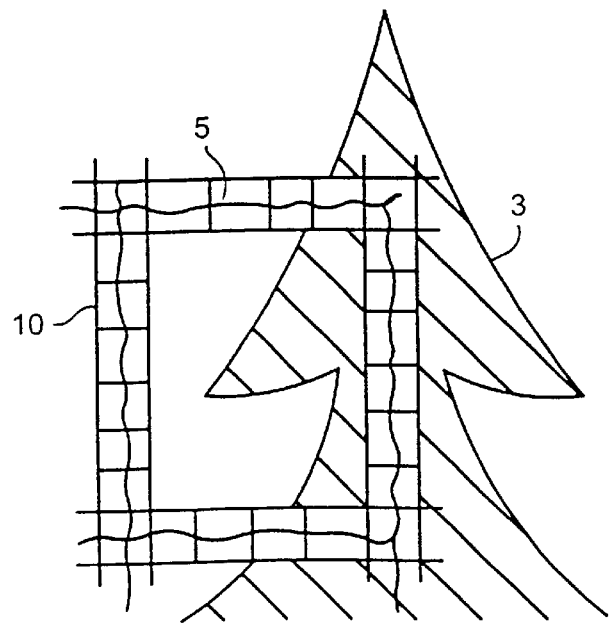
FIG. 7 is a schematic close-up view of part of FIG. 6 showing an overlap between an inserted logo and background video.

FIG. 7 is a schematic close-up view of part of FIG. 6 showing the overlap between the static map 5 and parts of the original image 3. In a block-based system such as MPEG 2 where each image is divided into so-called macroblocks, it can be seen that a number of macroblocks are affected by the overlap of the images. The macroblocks are illustrated as square blocks 10 in FIG. 7.

The remainder of the present description will deal with a video signal processor capable of handling the presence of video information from two sources A and B present on the screen at one time. A block diagram of the apparatus will be described first with reference to FIG. 8, followed by the flowchart of FIG. 9 defining its mode of operation. Particular features of the operation will then be described with reference to further respective Figures.

Accordingly, reference will now be made to FIG. 8 which is a schematic diagram of a video signal processor.

An encoder E1 receives an input video signal A and encodes it according to a desired output target bit rate TBR and GOP format. In situations where no mixing between the two video signals is required, the video signal encoded by the encoder E1 can be supplied directly for output via a switch S1 under the control of a controller 100. The encoder E1 is written in parentheses to illustrate the fact that if the input video signal is already in the required format, the encoder E1 may of course not be required.

The output of the encoder E1 is supplied to a complementary decoder D1 which decodes the video back to an uncompressed or "baseband" form. The baseband video signal is supplied to a mixer 110 and compression parameters used in the original compression in each block of the input video signal A are supplies to the controller 100.

A source 120 of a video signal to be mixed, video B, supplies video signal B to another encoder E3. Again, E3 is shown in parentheses to illustrate the fact that it may not be required if the video signal B is already in a required format. The output of encoder E3 is a video signal at a corresponding bit rate and GOP format to that of the output of encoder E1, and is supplied to a further decoder D3 which derives compression parameters from the video signal and decodes video B back to baseband form for supply to the mixer 110.

If desired, either one of the encoder-decoder pairs E1/D1 or E3/D3 may be omitted and uncompressed or "baseband" video provided in directly at one of the inputs of the mixer 110 to be added to decoded compressed video at the other of the inputs.

The source 120 also supplies a key signal K to the mixer 110 (although the key signal could of course come from a different external source). The key signal defines the relative proportions of video A and video B to be used for each pixel of the required output image, and so the key signal K may vary between 0 (all video A to be used) and 1 (all video B to be used). This variation takes place on a pixel-by-pixel basis, with K values between 0 and 1 indicating a mix between the two signals at that position.

Accordingly, the mixer 110 operates in a generally conventional manner, and on a pixel-by-pixel basis, to multiply pixels of video B by K at a multiplier 112, to multiply pixels of video A by (1−K) at a multiplier 114, and then to add the two products together at an adder 116 to generate pixels of an output mixed video signal. The mixed video signal is supplied to a further encoder E2, again operating to the same nominal bit rate and GOP format as E1 and E3, which serves to encode the mixed video signal for output via switch S1.

The controller 100 controls the operation of the encoder E2. In fundamental terms, the controller 100 controls whether the encoder E2 re-uses some or all of the compression parameters associated with the compression of blocks of the video signals A and B before they were mixed, or generates new compression parameters for encoding the blocks of the mixed video signal C.

As part of its operation, which will be described in much greater detail below, the controller 100 receives details of the compression parameters of video signal A, details of the compression parameters of video signal B and a specification of a target output data rate (TBR). The controller 100 also accesses memory stores 130 in which various pieces of information including some derived from the key signal K may be retained.

Figure 8:
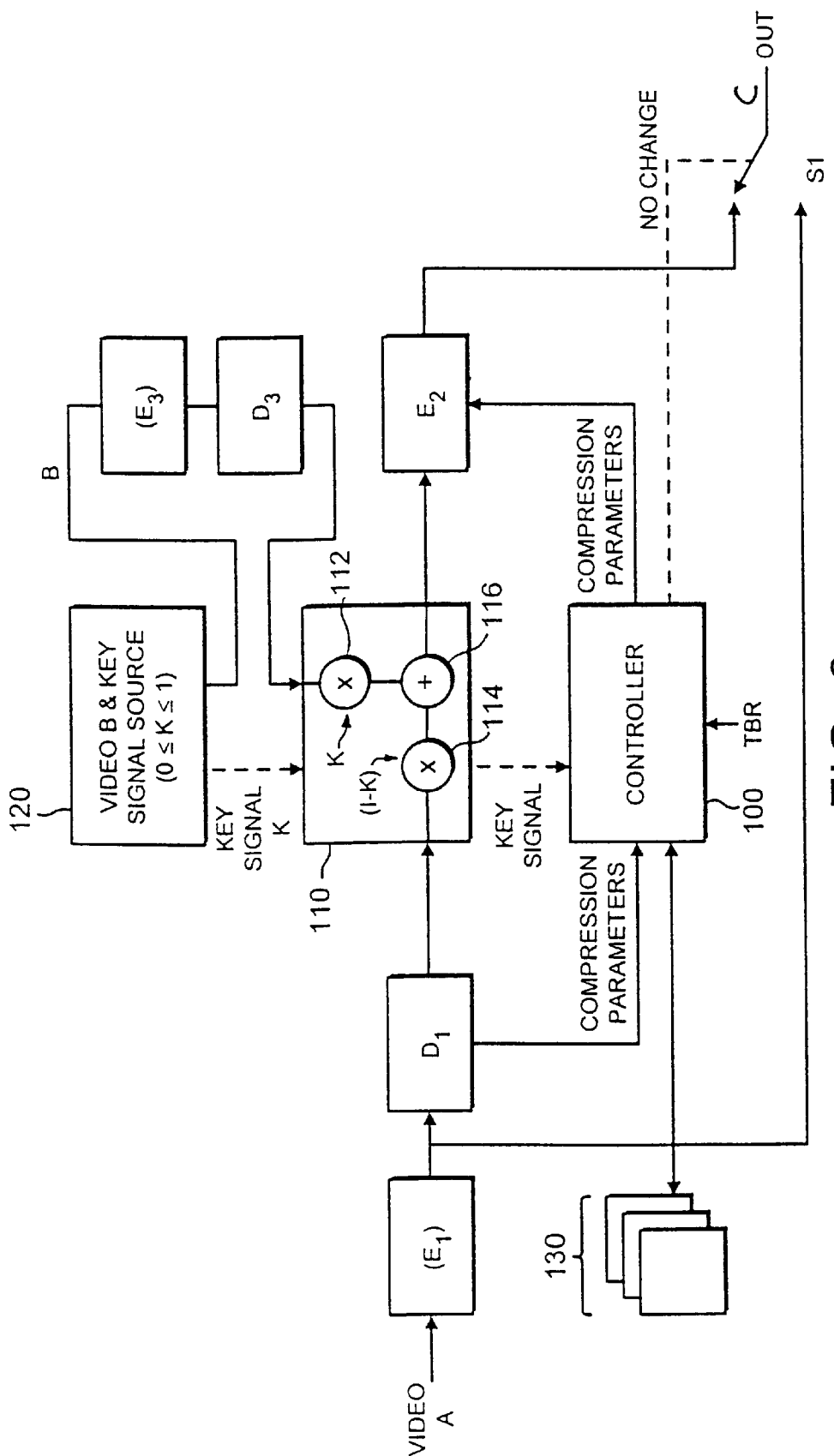
FIG. 8 is a schematic diagram of a video signal processor.
Figure 9:
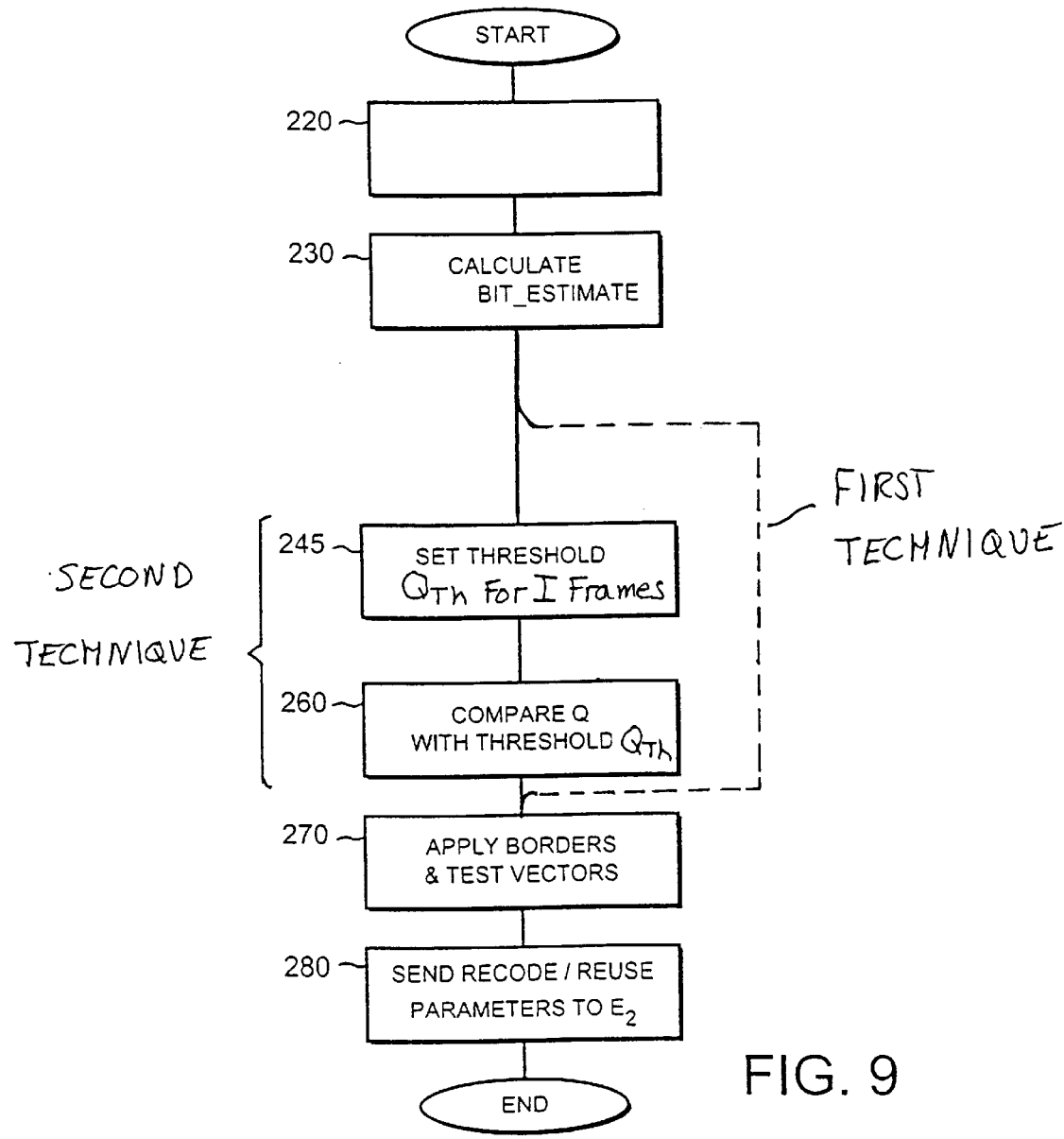
FIG. 9 is a schematic flow chart illustrating the operation of the processor of FIG. 8.

FIG. 9 is a flowchart schematically illustrating the operation of the processor of FIG. 8.

Figure 12:
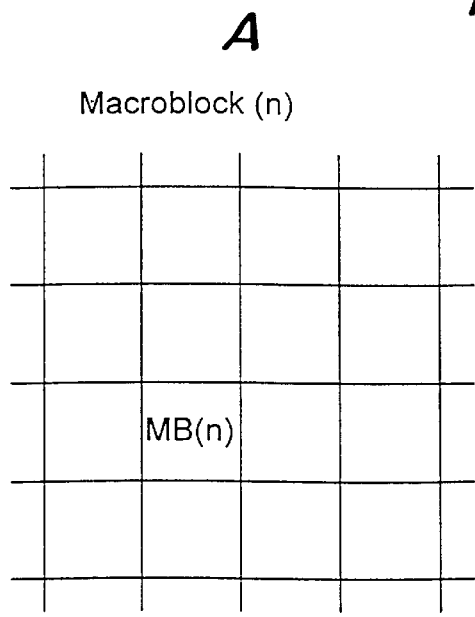
FIGS. 12 to 14 illustrate bit maps.
Figure 12:
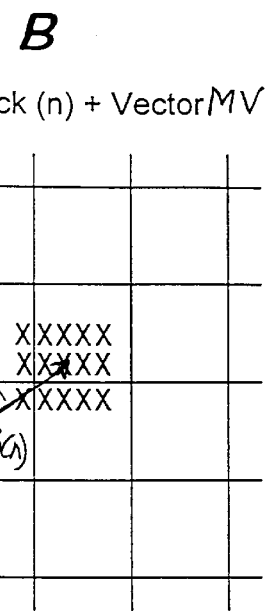

At a step 220, "Bit Maps" are derived from the key signal K indicating the positions in the compressed frames of the logo. This will be described in more detail below with reference to FIGS. 12A and B; 13A and B; and 14A to D.

At a step 230 the controller 100 establishes an estimate of the total number of bits required to encode the current frame of the mixed video signal. To do this, it does not actually apply a rate control algorithm to the mixed video signal, but instead calculates the estimate at least in part from historical data relating to the number of bits required to encode each macroblock of the two individual source video signals A and B. This process will be described in detail below.

The next step 245 is to set a "threshold" value which will be used (as described in detail below) to determine which macroblocks of I frames should be recoded completely and which should re-use the parameters associated with one, or both or the input video signals. This process will be described with reference to FIG. 10 below.

Figure 11:
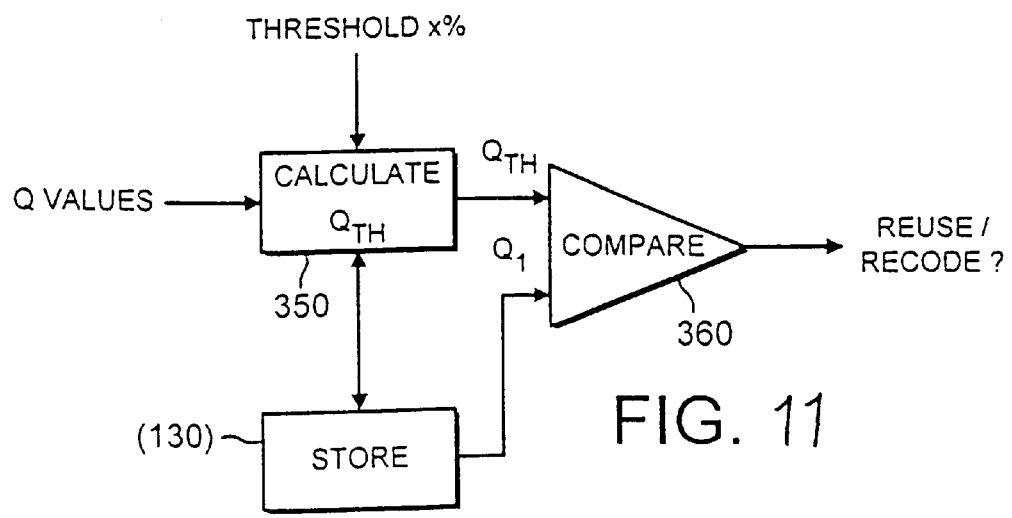
FIG. 11 schematically illustrates the comparison of quantisation parameter values with a threshold value.

At a step 260 the quantisation parameters for video A are compared with the threshold to determine a set of macroblocks to be re-coded. This is shown in FIG. 11.

Steps 245 and 260 are not used in some embodiments of the invention as indicated by the dashed line from step 230 to step 270.

At the step 270, a test is carried out to determine whether the motion vectors associated with the macroblocks of the mixed signal C point to valid areas of reference images. For example, a macroblock may be wholly inside video A, but its associated motion vector may point to a region replaced by video B in the reference frame. In these circumstances it would be inappropriate to use that motion vector. This process is described in detail below with the reference to FIGS. 12, 13 and 14.

Once this test is complete, the full set of re-code or re-use parameter information is sent by the controller 100 to the encoder E2 which encodes the mixed video signal C in accordance with this information. In cases where mixing takes place between video A and video B, the controller 100 operates the switch S1 to select the output of encoder E2 for the entire frame.

The encoder E2 includes a rate control algorithm. This may be, for example, a predictive rate control algorithms such as the so-called "test model 5" of the MPEG system, or maybe a pre-encode or rehearsal type rate control algorithm such as that described in GB-A-2 306 831. In any event, the parameters applied by the controller 100 to the rate control algorithm are identical to the original compression parameters received from the decoders D1 and D3 in the case of macroblocks where it has been determined that the parameters should be re-used, and, in the case of macroblocks where it has been determined that the parameters should not be re-used, comprise an indicator flag indicating to the rate control algorithm that new parameters should be derived.

A special case here is the particular situation of an inserted logo, where in order to maintain the picture quality of the logo itself it may be desirable to specify a limit for the quantisation parameter for use on blocks containing logo material in order to set a maximum degree of harshness of the quantisation process. Again, that condition can be signaled from the controller 100 to the rate control algorithm in respect of macroblocks determined to contain primarily or all video B material. (This of course depends on a subjective decision as to whether the inserted video signal comprises a logo or other material, and this is naturally a decision made by the operator or user).

The rate control algorithm of the encoder E2 generates compression parameters for those macroblocks to be re-encoded and then the encoder E2 encodes the whole frame on the basis of the received or derived parameters.

In the following description, it is assumed by way of example that logo information (such as textual logo and maps) represented in e.g. FIG. 3 by video B is superposed over video A. It is also assumed that encoder E3 and decoder D3 of FIG. 8 are both omitted.

Bit Map

As described above, a key signal K is generated pixel-by-pixel in known manner. The key signal is used as described above to superimpose the logo information onto the original scene. A bit map is generated from the key signal by the controller 100.

The bit map may have pixel resolution to indicate, pixel-by-pixel, the pixel positions containing logo information.

Alternatively the bit map may have macroblock resolution to indicate the macroblocks containing logo information.

Thus the bit map indicates the pixels or macroblocks MB which contain logo information (logo areas) and these which do not (non-logo areas).

Transcoding Parameters

The examples of the invention discussed in the following discussion refer to the following transcoding parameters;
1) Q which is the parameter defining the quantisation scales applied to a frame;
2) DCT_type, which is the parameter defining the type (field or frame) of DCT processing; and
3) Motion Vectors.

The first video bitstream A has I, P and B frames. These are decoded in decoder D, and recoded in encoder E2. The encoder E2 is controlled by controller 100 so that an I frame of the first bitstream A is recoded in stream C as I, a P frame is recoded as P, and a B frame is recoded as B.

The parameters Q and DCT-type are applied to the recoding of the combined original information and logo according to a first technique or, alternatively, according to a second technique.

First Technique

A) The I frames of the mixed signal C are re-encoded by encoder E2 re-using the Q and DCT_type parameters preserved from the I-frames of the original, first, video bitstream A unchanged. The re-encoded I frames will tend to have more data than the corresponding frames of the original bitstream because of the superposed logo information.

B and C) The P and B frames are re-encoded by the encoder E2. The quantisation parameters Q of the P and B frames of the mixed signals are recalculated.

D) The DCT_type of bitstream A is reused in all macroblocks of all frames of the recoded mixed signal C.

E) An estimate of the target number of bits for each frame is calculated in accordance with the step of 230 above i.e. from the historical number of bits required to encode the frames of bitstream A. The rate control will allocate bits to the I, P and B frames of the recoded GOP to meet the target bit rate (TBR).

Second Technique

A). I Frames, Q

Figure 10:
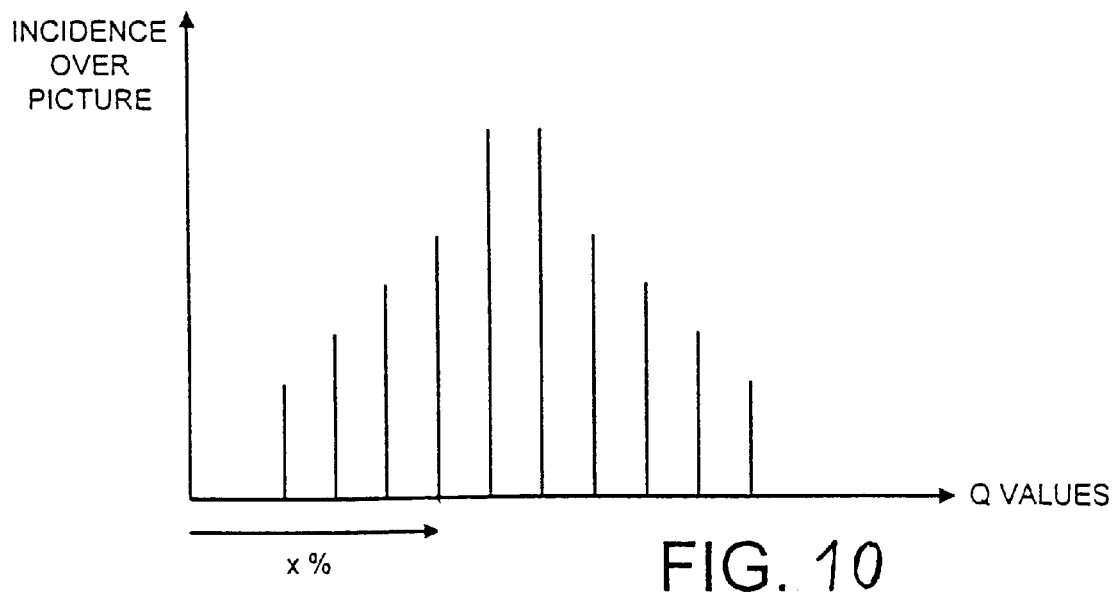
FIG. 10 is a schematic histogram illustrating the distribution of quantisation parameter values within a picture.

Referring to FIGS. 10 and 11, for each I frame of the original bitstream (without the logo), the distribution of Q scales amongst the macroblocks is determined. A threshold value $Q_{Th}$ of Q is determined empirically.

Referring to FIG. 11, the Q values from all of the macroblocks of each I frame are received by a Q threshold calculator 350 and stored in one of the stores 130. The Q threshold calculator then orders the Q values in ascending numerical order and derives the incidence of each possible Q value over the macroblocks of interest. A schematic histogram illustrating this process is shown in FIG. 10.

A threshold proportion x% is then applied to this distribution, so that highest Q value for which the cumulative incidence up to that Q value lies within the threshold proportion x % is established as $Q_{Th}$. The threshold proportion x % is for example in the range 25% to 60%, preferably 50% and more preferably 30%.

Then recoding of I frames including logo information by the encoder E2 takes place according to the following criteria:

In I frames of the mixed signal C (i.e. including the logo) the Q values preserved from the original bit stream A are re-used in image areas which do not contain logo information (non-logo areas). If the logo information is in a macroblock of the original image having a Q value equal to or less than the threshold, $Q_{Th}$ the preserved Q value is re-used. The Q value of all other logo information in an I frame is recalculated. The logo areas and non-logo areas are defined by the bit maps.

Thus macroblocks of the original bitstream having Q values up to and including that highest Q value $Q_{Th}$ are then encoded re-using their original Q value even if they contain logo information. Macroblocks, containing logo information and for which the Q value of the original bitstream A exceeds $Q_{Th}$ are fully re-encoded.

It is noted here that this system has as a convention that a numerically lower Q value implies a less harsh quantisation. The arrangement of re-using Q values up to an upper limit $Q_{Th}$ has the effect of not allowing deterioration of the picture quality of those macroblocks (of the ones under consideration) which were originally less harshly compressed.

Once $Q_{Th}$ been established, the Q values of the original bitstream A are read out from the store 130 and compared at a comparator 360 with $Q_{Th}$. The determination of whether to re-encode or to re-use is thus made, for macroblocks which in the re-encoded bitstream contains logo information. The macroblocks which contain logo information are indicated by the bit-maps.

B) P frames are re-encoded by the encoder E2. In P frames, the preserved Q values are re-used in non-logo areas. In the logo areas the Q values are recalculated.

C) B frames are re-encoded by the encoder E2. In B frames Q values are recalculated through out the frame.

D) The preserved DCT_type is re-used on all frames.

E) Rate Control

The recoding preferably uses Test Model 5 (ISO-IEC/JCT1/SC29/WG11/NO44) rate control modified as follows:

On non-logo areas of the I frame, the bits generated for each MB are accumulated to form a value "Reuse_Bits". On logo areas of the I frame, this value is used in conjunction with the number of logo MB's to that point in the frame to alter the target for Rate Control in the following way:

New_Target=Reuse_Bits+(target_bit_frame*logo_*MB*_so_far/total_MB)

This affects the equation for Rate Control in the following way:

New_virtual_buf=init_virtual_buf+picture_bit_generated–New_Target where picture_bit_generated is the number of bits generated to the current point in the frame, and comprises the bits generated by reuse, and the bits generated by Rate Control of the logo areas.

i.e. picture_bit_generated=logo_bits+Reuse_Bits

Thus New_Target cancels the effect of re-use on the target number of bits for the logo areas of the I frame, and allows Rate Control to perform as it would if the whole frame were being recoded.

The aim of using the threshold value $Q_{Th}$ is to re-use the "Q" in those area's that have a "low Q", and to allow "Rate Control" to operate in the "high Q" area's. In the "low Q" areas where there is a combination of the "background" and the logo, to preserve background quality we re-use the "Macroblock Q": see FIG. 7 which shows part of e.g. the map 5 through which object 3 is visible. Reducing the number of "Logo Macroblocks" that reuse "Q" allows "Rate Control" to make more bits available for the "P" and "B" frames.

Modification

In this second technique, the preserved value of Q is re-used if the Q of a macroblock is less than the reference Threshold $Q_{Th}$. The Threshold value may alternatively be one of:

a) a threshold proportional to activity:

b) a threshold proportional to motion vector size:

c) a threshold proportional to colour content.

Preserved values of Q are used to reduce image noise. Noise is less visible where motion vectors are large, activity is high or on some colours.

Motion Vector Processing

Overview

FIGS. 12 to 16 illustrate the processes carried out at steps 220 and 270 of FIG. 9, that is to say, producing a bit map and applying borders to boundaries between regions from the two video sources and then testing preserved motion vectors to be re-used to determine whether they point to appropriate parts of the material from the same video source.

Referring to FIG. 3, when a decision to re-use encoding parameters is made, it is important to ensure that a preserved motion vector to be re-used for a macroblock of the video A region actually points to a part of the image which is still formed of video A, i.e. it has not been replaced by video B as part of the mix, wipe or insertion process. The same applies to video B.

Figure 13:
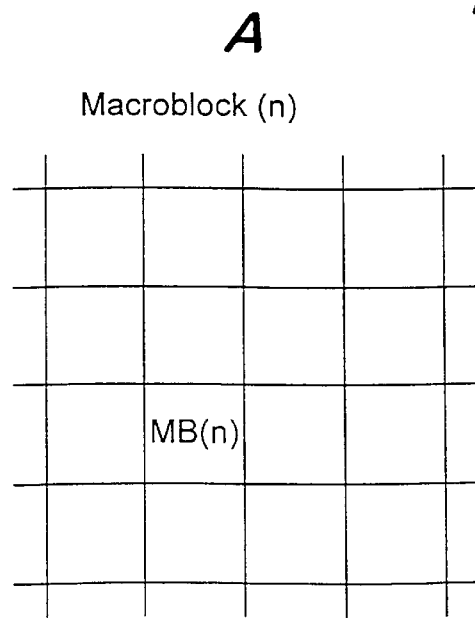
Figure 13:
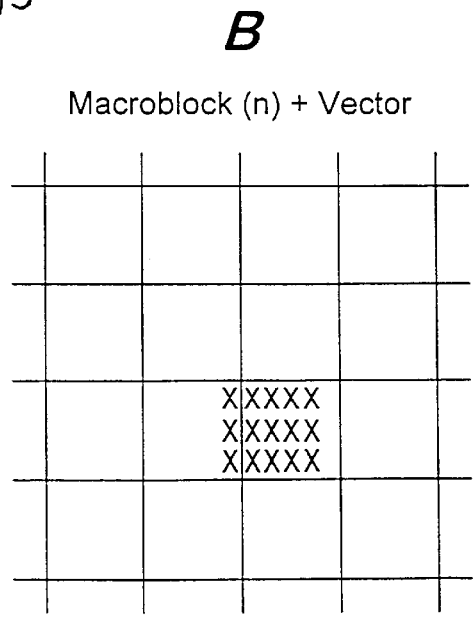
Figure 14:
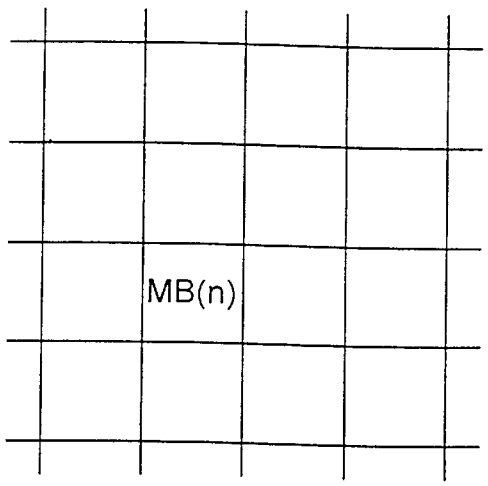
Figure 14:
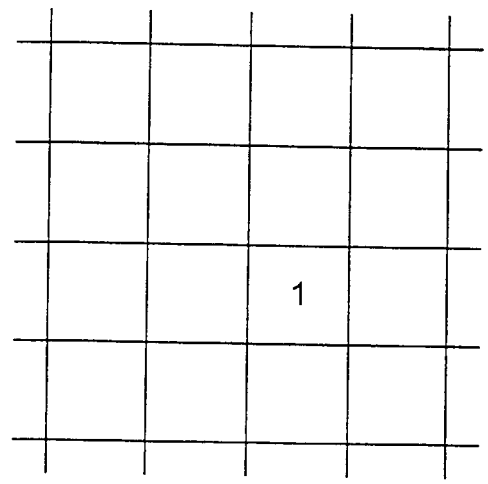
Figure 14:
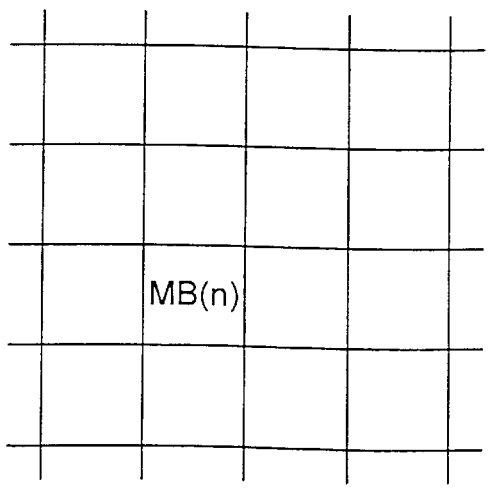
Figure 14:
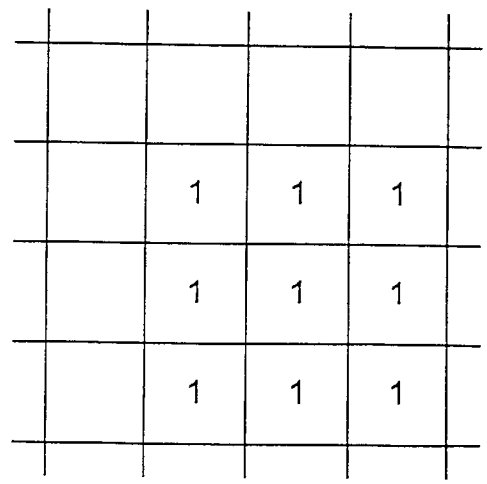
Figure 15:
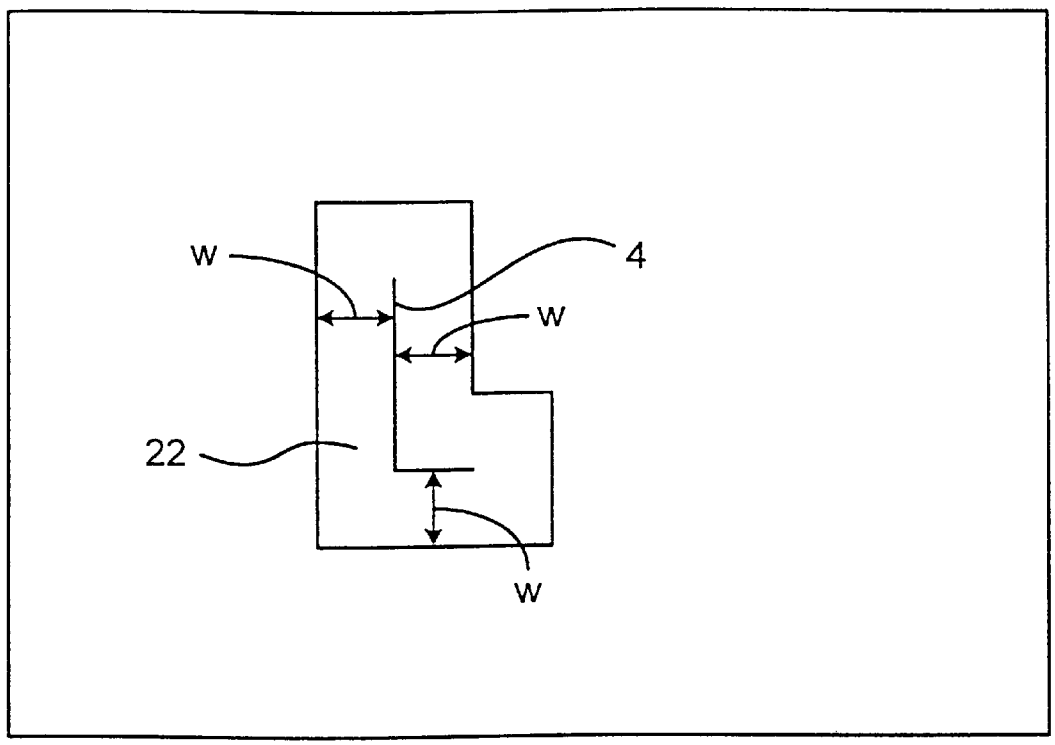
FIG. 15 illustrates another bit map.

Referring to FIGS. 14 and 15 a border (one macroblock wide in FIG. 14D) may be created around the newly inserted material. A benefit of this is that it allows the vector tests to be carried out around the newly inserted material. A benefit of this is that it allows the vector tests to be carried out at a macroblock scale rather than at a pixel scale (as in FIGS. 12 and 13) because the wide border provides an increased margin of safety to avoid errors which would otherwise be introduced by this coarser scale approach.

Thus, for example a border may be created around all macroblocks which are not entirely derived from region A and a border may be created around all macroblocks which are not entirely derived from region B.

So, if a preserved motion vector associated with a macroblock from region B points or refers to a) region A;

b) macroblocks which are not entirely from region B; or c) the border created around those macroblocks not entirely from region B;

it is not re-used but instead a new motion vector is generated in its place. Similarly, if a motion vector associated with a macroblock from region A points to:

a) region B;

b) macroblocks not entirely from region A; or c) the border created around those macroblocks not entirely from region A; again it is not re-used but instead a new motion vector is generated in its place.

EXAMPLES

Motion vectors may be processed according to any one of the illustrative techniques A, B and C described in the following. Any one of these techniques A, B and C may be used with the first and second techniques described above.

As discussed above the Motion Vectors $V_1$ of the original bitstream A are preserved for re-use in the encoder E2. New motion vectors $V_2$ are calculated for the combined video information including the logo information and the original video information. The sets of motion vectors $V_1$, $V_2$ are stored in files with indications indicating the macroblocks to which the motion vectors apply. In the techniques A, B and C described below, motion vectors are associated only with P and B frames. The files for B frames contain vectors for both Forward and Backward prediction.

Bit Maps

As discussed above Bit Maps are produced. Bit maps are produced for every frame showing where, in that frame, the logo information is.

A bit map is produced for an I-frame.

Each B frame uses two reference bit maps which are the bit maps of the forward frame and the backward frame to which the motion vectors of the B frame refer.

Each P frame has up to two bitmaps. One bit map is the bit map of that frame itself. The other bit map is the reference bit map i.e. the map of the frame to which the motion vectors of the P frame refer.

Technique A

The bit maps contain, for every pixel, a logic bit '1' or '0' indicating whether or not the pixel contains logo information.

'1'=logo '0'=non-logo.

Referring to FIG. 12A consider a macro block MB(n) in a P or B frame of the combined video information. Assume MB(n) does not contain logo information.

The preserved motion vector of MB(n) is tested against the logo bit maps, at pixel resolution. Thus referring to FIG. 12B it is tested against a 16 pixel×16 pixel area denoted by xxxx.

If any pixel in area xxxx equals 1, it contains logo information. Then a new vector $V_2$ is used for MB(n).

If all pixels in area xxxx equal 0 it contains non-logo information. Then a preserved vector $V_1$ is used for MB(n).

As a modification, instead of using the new vector $V_2$ if any pixel in the area xxxx contains logo information, a preserved vector $V_1$ could be used if a minority of the pixels in the area xxxx contain logo information.

Technique B

In this technique B the bit maps for the P and B frames have macroblock resolution. That is for each macroblock '1' indicates the macroblock contains logo information '0' indicates the macroblock does not contain logo information.

The preserved vectors are tested to a resolution of only one macroblock, for example to a resolution of 16 pixels, if macroblock contains 16×16 pixels.

Consider the situation of FIGS. 13A and 13B.

FIG. 13A shows a macroblock MB(n) of a P or B frame which does not contain logo information. Its motion vector points to an area xxxx of best match in another frame as shown in FIG. 13B. The area xxxx is adjacent the macroblock (n). Thus it is within 16 pixels of MB(n).

If MB(n) has a horizontal vector of value in the range 0 to 15 pixels to the right, it could incorrectly select logo pixels if pointing to a logo region.

The bit map corresponding to FIG. 13B is shown in FIG. 14B. To protect against the situation discussed with reference to FIGS. 13A and 13, in the reference frames a border of width equal to one macroblock is added around each macroblock containing logo information as shown in FIGS. 14C and 14D. The border is always one macroblock in embodiments of this second technique and is independent of vector range and of picture type.

The border is designated as containing logo information for the purposes of vector processing.

Referring to MB(n) in FIG. 14C, its motion vector is tested to a resolution of multiples of 16 pixels against macroblocks in the bit map file.

If any macroblock to which the preserved motion vector points contains logic 1 (i.e. it contains logo information or is a border), then a new vector $V_2$ is used for MB(n).

If all the macroblocks against which its preserved vector is tested contain non-logo information than the preserved vector $V_1$ is used for MB(n).

B frames use two reference bit maps as described above. A B frame may have a macroblock with motion vectors pointing to both a forward and a back-ward reference frame and thus to two reference bit maps, one motion vector in one direction may point to non-logo information and the other to logo information. An embodiment of the invention in such a situation may select the reference frame containing non-logo information and reuse the preserved vector $V_1$ for the macroblock; the other-reference frame is disregarded.

Technique C

Referring to FIG. 15, a bit map for a B or P frame is shown having logo information 4. A border 22 is provided around the logo information on the current frame being processed (not the reference frame as in techniques A and B above). The border has a width w dependent on the maximum vector range. The width w is for example 64 pixels horizontally and 32 pixels vertically.

Preferably the width w is twice the maximum vector range.

In one version of technique C, the maximum vector range is either detected from the MPEG parameters of the original video bitstream or is measured for each frame.

The border preferably has such width w that all macroblocks outside the border cannot have motion vectors referring to macroblocks within the border and containing logo information.

Thus preserved motion vectors $V_1$ are used for all macroblocks outside the border, and new motion vectors $V_2$ are calculated for all macroblocks within the border.

It will be appreciated that references to "frames" in the above description are by way of example only—in general the encoding is picture by picture, which could be frames, fields, a combination or other pictures.

The skilled man will appreciate that the apparatus described above may be implemented at least in part by a general purpose computer running appropriate software. Such software and a storage medium by which such software is stored are both considered to be embodiments of the invention.

What is claimed is:

1. A video signal processor comprising:
   a first input for receiving a compressed first video signal representing first video information including transcoding parameters associated with the pictures of the signal and relating to the compression of said first video signal,
   a decoder for decoding the compressed first video signal whilst preserving the parameters in association with the pictures,
   a second input for receiving a second video signal representing second video information to be combined with the said first video information,
   a combiner for combining the second video information with the fist video information to produce a picture of the combined information, comprising at least one part derived only from the first signal and at least one other part derived at least partly from the second signal, whereby the combined information picture is a mix of pixels from the first and second signals, and an encoder for compression encoding the said picture to produce a combined signal representing the combined information, which encoder reuses at least one of the said preserved parameters for encoding at least the said at least one part of the combined information which is derived only from the first signal.

2. A processor according to claim 1, wherein the combiner comprises a key signal generator for generating a key signal which indicates at least the positions, in a picture of the first signal, of second video information, and means for combining the second video information with the first at the positions indicated by the key signal.

3. A processor according to claim 2, wherein the combining means combines the first (A) and second (B) video information to produce a combined video signal (C) according to the equation:

$$C=AK+(1-K)B$$

Where K is the key signal and $0 \leq K \leq 1$.

4. A processor according to claim 1, wherein the first signal comprises intra-encoded pictures and inter-encoded pictures, and the encoder re-encodes intra-encoded pictures of the first signal as intra-encoded pictures of the combined signal and re-encodes inter-encoded pictures of the first signal as inter-encoded pictures of the combined signal.

5. A processor according to claim 4, wherein the encoder reuses at least one of the said preserved parameters for encoding at least the said at least one part of the combined information of an intra-encode picture which is derived only from the first signal and re-encodes at least one transcoding parameter of at least one part of the combined information of an inter-encoded picture which is derived at least partly from the second signal.

6. A processor according to claim 4, for processing video information including I, P and B pictures, wherein the encoder is arranged to encode I, P and B pictures of the first video signal as I, P and B pictures respectively of the combined signal.

7. A processor according to claim 6, wherein the encoder re-uses the said at least one preserved parameter associated with an I-picture of the first signal when encoding the whole of the corresponding I-picture of the combined signal.

8. A processor according to claim 7, wherein the said at least one parameter is a quantisation parameter.

9. A processor according to claim 7, wherein the encoder re-calculates at least one of the transcoding parameters over the whole of a P picture.

10. A processor according to claim 9, wherein the transcoding parameter which is recalculated over the whole of the P picture is a quantisation parameter.

11. A processor according to claim 7, wherein the encoder re-calculates at least one of the transcoding parameters over the whole of a B picture.

12. A processor according to claim 11, wherein the transcoding parameter which is recalculated over the whole of the B picture is a quantisation parameter.

13. A processor according to claim 7, wherein a parameter DCT_Type is reused in all pictures.

14. A processor according to claim 6, wherein the encoder re-uses the said at least one preserved parameter associated with an I-picture of the first signal when encoding part(s) of the corresponding I-picture of the combined signal which are not derived from the second signal and recalculates the said at least one preserved parameter of other part(s) of the corresponding I-picture of the combined signal which are derived from the second signal.

15. A processor according to claim 14, wherein the said at least one preserved parameter is a quantisation parameter, and the encoder responds to a threshold level of an image parameter, and:

reuses the preserved parameter for those other part(s) of the corresponding I-picture of the combined signal which are derived from the second signal and for which the image parameter is one of less and greater than the threshold level; and re-calculates the quantisation parameter for those other part(s) of the corresponding I-picture of the combined signal which are derived from the second signal and for which the image parameter is the other of less and greater than the threshold level.

16. A processor according to claim 15, wherein the said image parameter is a quantisation parameter of the first signal.

17. A processor according to claim 15, wherein the said image parameter is activity.

18. A processor according to claim 15, wherein the said image parameter is motion vector size.

19. A processor according to claim 15 wherein the said image parameter is colour content.

20. A processor according to claim 14, wherein the encoder reuses at least one of the preserved parameters associated with a P picture when re-encoding part(s) of the P pictures which are not derived from the second signal.

21. A processor according to claim 20, wherein the encoder re-calculates the said at least one of the transcoding parameters over other parts of the P picture.

22. A processor according to claim 21, wherein said at least one of the transcoding parameters associated with a P picture is a quantisation parameter.

23. A processor according to claim 14, wherein the encoder re-calculates at least one of the transcoding parameters over the whole of a B picture.

24. A processor according to claim 23, wherein the transcoding parameter which is recalculated over the whole of the B picture is a quantisation parameter.

25. A processor according to claim 14, wherein a parameter DCT_Type is reused in all pictures.

26. A computer program product comprising program instructions which when run on a programmable video signal processor implements the processor of claim 1.

27. A method of processing a video signal comprising the steps of:

receiving a compressed first video signal representing first video information including tanscoding parameters associated with the frames of the signal and relating to the compression, decoding the compressed first video signal whilst preserving the parameters in association with the frames, receiving a second video signal representing second video information to be combined with the said first video information, combining the second video information with the first video information to produce a picture of the combined information, comprising at least one part derived only from the first signal and at least one other part derived at least partly from the second signal, whereby the combined information picture is a mix of pixels from frames of the first and second signals, and encoding the said picture to produce a combined signal representing the combined information, which encoding step reuses at least one of the said preserved parameters for encoding at least the said at least one part of the combined information which is derived only from the first signal.

28. A computer program product comprising instructions which when run on a programmable video signal processor implements the method of claim 27.

29. A video signal processor according to claim 4, wherein, the said transcoding parameters include, in respect of inter-encoded pictures, motion vectors which refer to parts of reference pictures, and the encoder is arranged to produce compression encoded pictures including an inter-encoded picture and a reference picture, which encoder re-uses the said preserved motion vectors for those of the said first parts of the inter-encoded picture for which the preserved motion vectors refer to parts of the reference picture which are derived solely from the first video signal, and provides new motion vectors for other parts of the inter-encoded picture.

30. A processor according to claim 29, wherein new motion vectors are provided for parts of the inter-encoded picture which are derived at least in part from the second video signal.

31. A processor according to claim 29, wherein new motion vectors are provided for parts of the inter-encoded picture which are derived solely from the first signal but for which the preserved vectors refer to parts of the reference picture which are derived at least in part from the second video signal.

32. A processor according to claim 29, wherein the encoder calculates motion vectors for a picture of the combined video information, and tests the calculated and preserved motion vectors against a reference map indicating, in the reference picture to which the vectors refer, the positions of information derived at least in part from the second signal.

33. A processor according to claim 32, wherein the reference map has a resolution of one pixel.

34. A processor according to claim 32, wherein the reference map has a resolution of a block of pixels.

35. A processor according to claim 34, wherein the block is a macroblock and the motion vectors have a resolution of one macroblock.

36. A processor according to claim 34, wherein if a block to which a motion vector refers in the reference picture has any pixel of information derived from the second signal, then a new vector is provided for the block of the inter-encoded picture associated with that motion vector.

37. A processor according to claim 34, wherein if a block to which a motion vector refers in the reference picture has a majority of pixels of information derived from the second signal, then a new vector is provided for the block of the inter-encoded picture associated with that motion vector.

38. A processor according to claim 32, wherein a border of predetermined width is added around the positions in the reference map which indicate the positions of information derived from the second signal.

39. A processor according to claim 38, wherein the reference map has a resolution of a block of pixels and the border has a width of at least one block.

40. A processor according to claim 38, wherein new motion vectors are calculated for all parts of the combined information for which the preserved vectors refer to positions within the border.

41. A processor according to claim 29, wherein the encoder calculates new motion vectors for positions of the inter-encoded picture derived from at least the second signal and for a border of predetermined width, related to vector size, therearound.

42. A processor according to claim 41, wherein the border has a width equal to a predetermined proportion of the maximum motion vector range.

43. A processor according to claim 41, wherein the width of the border is at least the maximum motion vector range.

44. A processor according to claim 42, wherein the maximum vector range is calculated from the video information.

45. A processor according to claim 42, wherein the maximum vector range is determined from parameter data accompanying the compressed first video signal.

46. A processor according to claim 41, wherein new motion vectors are calculated for all image parts within the border, and the said preserved motion vectors are used for all image parts outside the border.

47. A video signal processing method according to claim 27, wherein the said transcoding parameters include, in respect of inter-encoded pictures, motion vectors which refer to parts of reference pictures, and comprising the steps of:

compression encoding the combined video information, to produce compression encoded pictures including an inter-encoded picture and a reference picture, which encoding re-uses the said preserved motion vectors for those of the said first parts of the inter-encoded picture for which the preserved motion vectors refer to parts of the reference picture which are derived solely from the first video signal, and provides new motion vectors for other parts of the inter-encoded picture.

48. A computer program product comprising instructions which when run on a programmable video signal processor implements the method of claim 47.

49. A video signal processor comprising:

a first input arrangement for receiving a compressed first video signal representing first video information and preserved transcoding parameters associated with the pictures of the signal and relating to the compression of said first video signal, a second input for receiving a second video signal representing second video information to be combined with the said first video information, a combiner for coining the second video information with the first video information to produce a picture of the combined information, comprising at least one part derived only from the first signal and at least one other part derived at least partly from the second signal, whereby the combined information picture is a mix of pixels from the first and second signals, and an encoder for compression encoding the said picture to produce a combined signal representing the combined information, which encoder reuses at least one of the said preserved parameters for encoding at least the said at least one part of the combined information which is derived only from the first signal.

* * * * *